US012710403B2

(12) United States Patent
Zhang

(10) Patent No.: US 12,710,403 B2
(45) Date of Patent: Aug. 18, 2026

(54) MULTIPORT GAS CHROMATOGRAPH PISTON VALVE

(71) Applicant: Rosemount Inc., Shakopee, MN (US)

(72) Inventor: Edward Zhang, Cypress, TX (US)

(73) Assignee: Rosemount Inc., Shakopee, MN (US)

( * ) Notice: Subject to any disclaimer, the term of this patent is extended or adjusted under 35 U.S.C. 154(b) by 259 days.

(21) Appl. No.: 18/619,863

(22) Filed: Mar. 28, 2024

(65) Prior Publication Data

US 2025/0305997 A1 Oct. 2, 2025

(51) Int. Cl.
*G01N 30/20* (2006.01)

(52) U.S. Cl.
CPC ....... *G01N 30/20* (2013.01); *G01N 2030/201* (2013.01); *G01N 2030/205* (2013.01)

(58) Field of Classification Search
CPC ........ G01N 30/02; G01N 30/06; G01N 30/88; G01N 2030/027; G01N 30/34;
(Continued)

(56) References Cited

U.S. PATENT DOCUMENTS

93 A 11/1836 Burt et al.
120 A 2/1837 Thaddeus
(Continued)

FOREIGN PATENT DOCUMENTS

CN 107110833 A * 8/2017 ........... G01N 30/468
CN 112610722 A 4/2021
(Continued)

OTHER PUBLICATIONS

International Search Report and Written Opinion for International Application No. PCT/US2025/021461, dated Jul. 2, 2025, 7 Pages.
(Continued)

*Primary Examiner* — Andre J Allen
(74) *Attorney, Agent, or Firm* — Christopher R. Christenson; Kelly, Holt & Christenson, P.L.L.C.

(57) ABSTRACT

A multiport gas chromatograph piston valve includes a first plate, a first diaphragm, a second plate, a second diaphragm, a plurality of pistons, and a third plate. The first plate has a bottom surface and includes a plurality of analytical gas ports. The first diaphragm is disposed adjacent the bottom surface of the first plate. The first diaphragm includes a gas flow path in fluidic communication with the plurality of analytical gas ports. The second plate has a plurality of apertures therethrough. The plurality of pistons, each piston having a base and a cylindrical portion that is configured to be slidably received by a respective aperture in the second plate, are disposed such that the bases of the pistons are in substantially one plane when the valve is not actuated. A second diaphragm includes a first plurality of gas pockets and a second plurality of gas pockets, wherein the first plurality of gas pockets are disposed adjacent a first set of pistons, and the second plurality of gas pockets are disposed adjacent a second set of pistons. The third plate includes a first gas activation port and a second gas activation port, the first gas activation port being fluidically coupled to the first plurality of gas pockets, and wherein the second gas activation port is coupled to the second plurality of gas pockets.

20 Claims, 8 Drawing Sheets

(58) Field of Classification Search
CPC .. G01N 30/74; G01N 30/32; G01N 2030/025; G01N 30/30; G01N 30/20; G01N 30/72; G01N 30/24; G01N 30/96; G01N 30/56; G01N 2030/324; G01N 30/16; G01N 2030/062; G01N 30/90; G01N 30/461; G01N 30/6004; G01N 30/60; G01N 30/7233; G01N 30/6095; G01N 30/466; G01N 2030/326; G01N 30/8658; G01N 30/38; G01N 30/12; G01N 30/14; G01N 30/463; G01N 30/6017; G01N 33/558; G01N 30/6026; G01N 30/8675; G01N 30/54; G01N 30/86; G01N 30/468; G01N 30/6052; G01N 30/8679; G01N 30/7206; G01N 30/8631; G01N 2030/8804; G01N 30/6047; G01N 2030/201; G01N 30/6091; G01N 2030/202; G01N 30/603; G01N 2030/3084; G01N 30/6021; G01N 30/36; G01N 30/84; G01N 33/54388; G01N 30/64; G01N 2030/884; G01N 2030/047; G01N 2030/8813; G01N 30/68; G01N 2030/8831; G01N 2030/965; G01N 2030/565; G01N 30/08; G01N 30/7266; G01N 2030/3007; G01N 30/26; G01N 30/6039; G01N 30/50; G01N 30/62; G01N 30/8651; G01N 30/82; G01N 30/18; G01N 30/94; G01N 2030/8881; G01N 30/8693; G01N 2030/085; G01N 2030/522; G01N 30/52; G01N 30/46; G01N 30/6069; G01N 2030/347; G01N 30/78; G01N 30/42; G01N 2030/328; G01N 30/465; G01N 30/6034; G01N 30/04; G01N 30/8665; G01N 30/80; G01N 2030/562; G01N 30/8634; G01N 30/10; G01N 2030/207; G01N 2030/067; G01N 30/95; G01N 2030/045; G01N 2030/065; G01N 2030/8809; G01N 33/6848; G01N 30/89; G01N 30/8624; G01N 2030/528; G01N 30/28; G01N 30/66; G01N 30/8686; G01N 2030/889; G01N 30/22; G01N 2030/8854; G01N 30/00; G01N 30/40; G01N 30/606; G01N 30/58; G01N 30/92; G01N 30/6043; G01N 35/1097; G01N 30/6078; G01N 2030/146; G01N 2030/126; G01N 30/93; G01N 30/44; G01N 1/405; G01N 2030/567; G01N 33/577; G01N 30/6065; G01N 2030/3046; G01N 2030/042; G01N 2030/121; G01N 30/8668; G01N 2030/626; G01N 30/8641; G01N 33/6854; G01N 30/462; G01N 2030/3076; G01N 33/533; G01N 2030/385; G01N 30/8696; G01N 21/05; G01N 33/543; G01N 2030/8886; G01N 2030/8822; G01N 30/91; G01N 2030/3061; G01N 30/6082; G01N 2030/402; G01N 2030/525; G01N 2030/625; G01N 2030/009; G01N 33/56983; G01N 2030/628; G01N 2030/3015; G01N 21/33; G01N 33/54306; G01N 33/68; G01N 2030/383; G01N 33/6803; G01N 2030/3038; G01N 2030/167; G01N 2030/524; G01N 2030/645; G01N 2030/623; G01N 33/531; G01N 33/54366; G01N 2030/127; G01N 33/54387; G01N 2030/342; G01N 2030/122; G01N 2030/3053; G01N 2030/6013; G01N 21/8483; G01N 33/54313; G01N 2030/885; G01N 27/62; G01N 33/538; G01N 33/54393; G01N 2030/3023; G01N 2030/125; G01N 2030/8411; G01N 1/34; G01N 2030/0095; G01N 2030/205; G01N 2030/746; G01N 30/8637; G01N 2030/8827; G01N 30/8644; G01N 2030/8417; G01N 30/8617; G01N 2030/8435; G01N 2030/386; G01N 30/467; G01N 35/1095; G01N 2030/8872; G01N 33/54353; G01N 2030/8877; G01N 33/54346; G01N 21/78; G01N 1/40; G01N 2030/285; G01N 2030/527; G01N 2030/587; G01N 2030/128; G01N 2030/204; G01N 33/2823; G01N 2030/8836; G01N 35/00732; G01N 33/582; G01N 2030/143; G01N 27/44747; G01N 2030/322; G01N 2001/2229; G01N 2030/185; G01N 2030/387; G01N 33/532; G01N 2030/381; G01N 30/6086; G01N 1/38; G01N 21/64; G01N 30/8672; G01N 33/53; G01N 30/6073; G01N 33/28; G01N 30/8662; G01N 30/70; G01N 33/5308; G01N 2030/303; G01N 1/28; G01N 21/6428; G01N 1/22; G01N 30/8682; G01N 2030/642; G01N 27/623; G01N 33/15; G01N 21/01; G01N 33/566; G01N 30/8606; G01N 30/8603; G01N 33/6851; G01N 2021/0346; G01N 33/54386; G01N 33/545; G01N 2030/8859; G01N 2030/008; G01N 35/10; G01N 1/44; G01N 27/66; G01N 33/56911; G01N 35/1004; G01N 27/622; G01N 2030/906; G01N 2030/6008; G01N 27/447; G01N 27/626; G01N 33/6845; G01N 33/54373; G01N 2560/00; G01N 2030/407; G01N 33/58; G01N 2030/165; G01N 2030/8818; G01N 30/7273; G01N 33/587; G01N 35/04; G01N 2030/208; G01N 35/00; G01N 33/94; G01N 2030/945; G01N 21/31; G01N 33/52; G01N 33/6893; G01N 2030/0035; G01N 2030/862; G01N 33/442; G01N 33/6842; G01N 33/02; G01N 1/14; G01N 21/4133; G01N 33/44; G01N 33/5302; G01N 33/553; G01N 27/64; G01N 33/585; G01N 2030/3069; G01N 2030/847; G01N 21/6486; G01N 2030/8429; G01N 33/54326; G01N 2030/8405; G01N 33/92; G01N 35/00623; G01N 2030/405; G01N 2030/8423; G01N 2030/123; G01N 2030/8494; G01N 21/85; G01N 2440/38; G01N 30/8627; G01N 2030/521; G01N 30/7213; G01N 30/724; G01N 33/723; G01N 27/44717; G01N 33/497; G01N 35/0092; G01N 30/8689; G01N 2030/445; G01N 21/645; G01N 27/44721; G01N 33/721; G01N 35/00871; G01N 31/12; G01N 1/4055; G01N 21/65; G01N 21/658; G01N 33/72;

G01N 33/74; G01N 1/2214; G01N 2030/388; G01N 2030/8868; G01N 2469/10; G01N 33/00; G01N 33/2829; G01N 35/1079; G01N 2030/8845; G01N 27/624; G01N 33/6806; G01N 21/6402; G01N 33/56988; G01N 35/0099; G01N 30/7293; G01N 33/5695; G01N 35/028; G01N 27/18; G01N 1/2226; G01N 33/493; G01N 2035/0441; G01N 21/76; G01N 35/109; G01N 21/3504; G01N 33/544; G01N 35/1011; G01N 30/76; G01N 35/00584; G01N 33/56916; G01N 2030/582; G01N 2035/00752; G01N 2001/4061; G01N 2030/685; G01N 2333/35; G01N 33/491; G01N 2021/6439; G01N 30/7253; G01N 33/571; G01N 33/573; G01N 33/5764; G01N 2035/00524; G01N 27/22; G01N 30/7246; G01N 2030/022; G01N 21/6408; G01N 2400/00; G01N 2333/20; G01N 31/00; G01N 33/2835; G01N 2013/006; G01N 2035/00495; G01N 27/70; G01N 30/861; G01N 33/047; G01N 33/48; G01N 33/50; G01N 21/53; G01N 2333/162; G01N 33/82; G01N 2333/165; G01N 2469/20; G01N 33/588; G01N 21/359; G01N 33/743; G01N 33/76; G01N 33/80; G01N 2030/8648; G01N 21/72; G01N 24/08; G01N 31/22; G01N 35/026; G01N 1/02; G01N 21/25; G01N 21/47; G01N 33/225; G01N 33/569; G01N 1/4044; G01N 2021/3595; G01N 21/5911; G01N 2333/11; G01N 33/542; G01N 1/00; G01N 2030/8447; G01N 33/56972; G01N 1/24; G01N 2030/621; G01N 2030/8441; G01N 2333/7051; G01N 2333/70517; G01N 33/241; G01N 33/56966; G01N 2030/7226; G01N 2030/77; G01N 2035/00435; G01N 21/39; G01N 21/41; G01N 30/7286; G01N 35/1009; G01N 2035/00326; G01N 27/12; G01N 27/4473; G01N 30/728; G01N 33/548; G01N 33/66; G01N 35/025; G01N 1/10; G01N 2035/00198; G01N 25/18; G01N 27/453; G01N 33/6809; G01N 15/0205; G01N 27/44704; G01N 29/022; G01N 33/96; G01N 1/4077; G01N 2333/4737; G01N 27/4045; G01N 33/726; G01N 1/286; G01N 2001/4033; G01N 2021/6482; G01N 21/84; G01N 2800/52; G01N 33/523; G01N 2021/7759; G01N 2570/00; G01N 21/27; G01N 2333/805; G01N 2001/2893; G01N 2030/743; G01N 33/0006; G01N 33/5306; G01N 35/00009; G01N 35/1065; G01N 21/73; G01N 2333/31; G01N 30/722; G01N 33/552; G01N 2035/00356; G01N 2035/0091; G01N 27/221; G01N 31/005; G01N 33/487; G01N 33/564; G01N 35/08; G01N 35/085; G01N 2001/383; G01N 21/03; G01N 21/0332; G01N 21/3577; G01N 30/0005; G01N 13/00; G01N 15/02; G01N 15/06; G01N 21/07; G01N 21/643; G01N 2458/15; G01N 27/44756; G01N 30/8655; G01N 33/56933; G01N 33/689; G01N 15/075; G01N 2035/1025; G01N 2333/904; G01N 33/24; G01N 33/56944; G01N 1/2273; G01N 2001/4088; G01N 2030/382; G01N 2291/0256; G01N 27/44752; G01N 35/1016; G01N 2021/0112; G01N 2035/00801; G01N 2291/021; G01N 2291/0423; G01N 2291/0426; G01N 23/046; G01N 27/06; G01N 27/226; G01N 27/30; G01N 33/521; G01N 33/54389; G01N 2035/1053; G01N 21/6456; G01N 2201/0221; G01N 2333/135; G01N 2333/986; G01N 33/0009; G01N 33/1826; G01N 35/00712; G01N 1/18; G01N 2001/4027; G01N 2021/6417; G01N 2035/009; G01N 2035/0405; G01N 21/314; G01N 27/26; G01N 33/0027; G01N 33/0031; G01N 35/1002; G01N 5/04; G01N 2001/002; G01N 21/35; G01N 21/45; G01N 21/77; G01N 2333/902; G01N 2458/40; G01N 27/44743; G01N 33/0001; G01N 33/54333; G01N 33/54391; G01N 33/9446; G01N 2035/00158; G01N 2035/00881; G01N 2035/0484; G01N 2035/103; G01N 21/255; G01N 27/44791; G01N 35/02; G01N 2001/4016; G01N 21/251; G01N 21/274; G01N 2333/005; G01N 2333/015; G01N 33/2882; G01N 33/5002; G01N 27/3272; G01N 30/726; G01N 33/287; G01N 2030/8895; G01N 2201/0627; G01N 33/04; G01N 33/22; G01N 33/49; G01N 33/5076; G01N 33/6887; G01N 33/78; G01N 1/4022; G01N 11/04; G01N 11/08; G01N 15/08; G01N 2030/0015; G01N 2030/647; G01N 2035/00851; G01N 21/0303; G01N 21/15; G01N 27/44773; G01N 33/5758; G01N 37/00; G01N 15/0211; G01N 2030/8476; G01N 2035/0491; G01N 2035/0498; G01N 2035/1032; G01N 21/3103; G01N 21/67; G01N 21/86; G01N 23/04; G01N 27/301; G01N 27/44795; G01N 33/5304; G01N 33/9493; G01N 2021/052; G01N 2021/4146; G01N 2021/6467; G01N 2035/0429; G01N 2035/0465; G01N 21/59; G01N 2201/0621; G01N 2201/129; G01N 31/10; G01N 33/0004; G01N 33/56938; G01N 33/6896; G01N 1/2202; G01N 2001/045; G01N 2001/2267; G01N 2021/0321; G01N 2021/0357; G01N 2030/3092; G01N 2035/0439; G01N 21/3581; G01N 22/00; G01N 2201/061; G01N 2201/0693; G01N 2201/08; G01N 2333/245; G01N 2333/47; G01N 2333/4712; G01N 27/423; G01N 2800/324; G01N 29/0672; G01N 33/0011; G01N 33/2805; G01N 33/535; G01N 33/557; G01N 33/56961; G01N 33/56994; G01N 33/60; G01N 33/686; G01N 35/00722; G01N 1/26; G01N 2021/6484; G01N 2030/903; G01N 2035/00782; G01N 2035/041; G01N

2333/59; G01N 27/16; G01N 27/185; G01N 27/4166; G01N 33/0098; G01N 33/12; G01N 33/6857; G01N 2015/0038; G01N 2021/335; G01N 2021/7786; G01N 2035/00554; G01N 2035/00831; G01N 2035/0444; G01N 21/0317; G01N 21/6458; G01N 2223/419; G01N 2440/14; G01N 27/00; G01N 27/68; G01N 2800/042; G01N 31/16; G01N 33/0032; G01N 33/025; G01N 33/182; G01N 33/48735; G01N 33/5008; G01N 33/6812; G01N 1/2035; G01N 2001/381; G01N 2021/8557; G01N 2035/00237; G01N 2035/1037; G01N 2333/38; G01N 2333/976; G01N 2440/10; G01N 25/14; G01N 25/147; G01N 27/14; G01N 33/0062; G01N 33/14; G01N 33/536; G01N 33/559; G01N 35/00693; G01N 35/1081; G01N 9/36; G01N 1/42; G01N 2001/028; G01N 2035/00108; G01N 21/3151; G01N 21/552; G01N 21/766; G01N 21/82; G01N 2201/068; G01N 2430/00; G01N 2800/348; G01N 33/0018; G01N 33/581; G01N 2021/5923; G01N 2021/5961; G01N 2021/5969; G01N 2021/5984; G01N 2021/5996; G01N 2035/00346; G01N 2035/1069; G01N 2333/08; G01N 2333/195; G01N 2600/00; G01N 35/1067; G01N 9/04; G01N 9/30; G01N 15/0826; G01N 2001/022; G01N 2021/3155; G01N 2021/8488; G01N 2030/162; G01N 2030/8452; G01N 2030/8863; G01N 2035/00564; G01N 2035/00772; G01N 2035/00811; G01N 2035/0093; G01N 2035/1027; G01N 2035/106; G01N 21/09; G01N 21/11; G01N 21/49; G01N 21/631; G01N 2201/1242; G01N 2333/4716; G01N 2496/00; G01N 33/0019; G01N 33/0034; G01N 33/0057; G01N 33/526; G01N 33/725; G01N 33/9406; G01N 33/9486; G01N 1/4005; G01N 15/01; G01N 2001/4083; G01N 2021/0382; G01N 2021/6432; G01N 2030/8458; G01N 2035/00792; G01N 2035/0493; G01N 2035/1046; G01N 21/00; G01N 21/3563; G01N 21/7746; G01N 2201/101; G01N 23/2258; G01N 2333/415; G01N 2333/916; G01N 2400/40; G01N 25/00; G01N 25/04; G01N 33/146; G01N 33/2811; G01N 33/6815; G01N 33/6827; G01N 15/0643; G01N 2001/2873; G01N 2001/4066; G01N 2021/1774; G01N 2021/4761; G01N 2021/641; G01N 2021/6463; G01N 2035/00247; G01N 2035/00277; G01N 2035/00306; G01N 2035/00514; G01N 2035/0425; G01N 21/17; G01N 21/1702; G01N 21/63; G01N 2201/062; G01N 2291/0289; G01N 2333/37; G01N 27/125; G01N 2800/04; G01N 2800/50; G01N 33/0013; G01N 33/525; G01N 35/00594; G01N 1/2205; G01N 1/2813; G01N 15/00; G01N 2001/1427; G01N 2001/205; G01N 2030/765; G01N 2035/00445; G01N 2035/00762; G01N 2035/0415; G01N 2035/1055; G01N 2291/0215; G01N 2333/075; G01N 2470/04; G01N 2496/80; G01N 2800/7028; G01N 31/168; G01N 33/005; G01N 33/10; G01N 33/1893; G01N 33/539; G01N 9/00; G01N 9/32; G01N 1/04; G01N 11/00; G01N 2021/3181; G01N 21/031; G01N 21/21; G01N 2201/0231; G01N 27/02; G01N 27/04; G01N 27/041; G01N 27/4074; G01N 27/4075; G01N 27/44726; G01N 27/44769; G01N 2800/065; G01N 2800/085; G01N 30/8613; G01N 33/0008; G01N 33/0014; G01N 33/0016; G01N 33/0063; G01N 33/18; G01N 33/184; G01N 33/2841; G01N 33/4977; G01N 33/528; G01N 33/5434; G01N 33/57515; G01N 1/2247; G01N 15/0625; G01N 2001/4011; G01N 2013/003; G01N 2015/0687; G01N 2021/0378; G01N 2021/7789; G01N 2035/0422; G01N 2035/0475; G01N 2035/0477; G01N 21/171; G01N 21/453; G01N 21/4795; G01N 21/8851; G01N 2333/01; G01N 2333/16; G01N 2333/255; G01N 2333/315; G01N 2333/70596; G01N 27/308; G01N 27/49; G01N 2800/26; G01N 2800/28; G01N 2800/2821; G01N 2800/368; G01N 33/26; G01N 33/48707; G01N 33/5085; G01N 33/5436; G01N 33/86; G01N 5/00; G01N 2001/2866; G01N 2021/1765; G01N 2021/6491; G01N 2035/0418; G01N 2035/042; G01N 2035/1051; G01N 21/19; G01N 21/3586; G01N 21/71; G01N 21/94; G01N 2201/0642; G01N 2223/03; G01N 2333/09; G01N 2333/185; G01N 2333/30; G01N 2333/4725; G01N 2333/924; G01N 2400/10; G01N 2470/10; G01N 2474/00; G01N 2500/00; G01N 27/045; G01N 27/07; G01N 27/08; G01N 27/404; G01N 2800/7095; G01N 29/44; G01N 33/0022; G01N 33/1813; G01N 33/188; G01N 33/483; G01N 33/5005; G01N 33/551; G01N 33/57525; G01N 33/6818; G01N 33/6869; G01N 33/9453; G01N 1/2258; G01N 2001/1463; G01N 2011/0026; G01N 2015/0216; G01N 2021/115; G01N 2021/6469; G01N 2021/7796; G01N 2021/8887; G01N 2030/8464; G01N 2035/00841; G01N 2035/1018; G01N 2035/1041; G01N 21/23; G01N 21/4788; G01N 21/8422; G01N 2201/022; G01N 2201/069; G01N 2333/265; G01N 2333/4709; G01N 2333/4719; G01N 2333/4724; G01N 2333/575; G01N 2333/585; G01N 2333/65; G01N 2333/918; G01N 2333/98; G01N 24/087; G01N 2430/10; G01N 2500/04; G01N 27/228; G01N 2800/60; G01N 33/03; G01N 33/48714; G01N 33/5091; G01N 33/5438; G01N 33/561; G01N 33/5753; G01N 33/6824; G01N 33/84; G01N

35/0098; G01N 7/00; G01N 7/14; G01N 1/30; G01N 15/065; G01N 15/0806; G01N 15/082; G01N 2001/2223; G01N 2021/151; G01N 2021/1787; G01N 2021/634; G01N 2021/6419; G01N 2035/00633; G01N 2035/00891; G01N 2035/0453; G01N 2035/1013; G01N 2035/1058; G01N 2035/1088; G01N 21/51; G01N 21/553; G01N 21/75; G01N 2201/064; G01N 23/2251; G01N 25/72; G01N 27/10; G01N 27/24; G01N 27/42; G01N 27/44782; G01N 2800/36; G01N 29/024; G01N 3/02; G01N 33/0036; G01N 33/0049; G01N 33/56922; G01N 33/946; G01N 35/1074; G01N 15/1023; G01N 17/00; G01N 2015/0046; G01N 2015/0288; G01N 2015/0846; G01N 2015/1028; G01N 2021/216; G01N 2021/6421; G01N 2021/6423; G01N 2030/001; G01N 2035/00386; G01N 2035/00534; G01N 21/43; G01N 21/69; G01N 2201/0668; G01N 2201/124; G01N 2201/1293; G01N 23/223; G01N 2333/23; G01N 2333/32; G01N 2333/471; G01N 2333/76; G01N 2496/05; G01N 25/22; G01N 2500/10; G01N 27/302; G01N 27/38; G01N 27/4071; G01N 27/48; G01N 27/74; G01N 27/82; G01N 2800/00; G01N 2800/2871; G01N 29/032; G01N 29/036; G01N 29/069; G01N 33/0026; G01N 33/0042; G01N 33/4875; G01N 33/4915; G01N 33/4975; G01N 33/5011; G01N 33/5097; G01N 33/537; G01N 33/575; G01N 33/57565; G01N 33/5761; G01N 33/5767; G01N 33/64; G01N 33/70; G01N 7/04; G01N 1/2211; G01N 13/02; G01N 2001/227; G01N 2001/248; G01N 2001/288; G01N 2001/387; G01N 2021/1706; G01N 2021/1748; G01N 2021/1793; G01N 2021/414; G01N 2021/5957; G01N 2021/8494; G01N 2035/102; G01N 21/4738; G01N 21/474; G01N 21/532; G01N 21/6404; G01N 21/648; G01N 21/718; G01N 2201/06166; G01N 2201/0639; G01N 2223/401; G01N 2291/02809; G01N 2333/04; G01N 2333/14; G01N 2333/205; G01N 2333/285; G01N 2333/42; G01N 2333/4731; G01N 2333/475; G01N 2333/61; G01N 2333/70539; G01N 2333/79; G01N 2333/908; G01N 2333/96486; G01N 2333/978; G01N 24/085; G01N 2400/02; G01N 2440/00; G01N 25/12; G01N 25/20; G01N 2500/02; G01N 27/416; G01N 27/4167; G01N 27/44739; G01N 2800/044; G01N 2800/12; G01N 2800/222; G01N 2800/30; G01N 2800/325; G01N 2800/347; G01N 29/02; G01N 3/12; G01N 33/143; G01N 33/1846; G01N 33/222; G01N 33/46; G01N 33/492; G01N 33/5014; G01N 33/5432; G01N 33/6821; G01N 33/6884; G01N 33/88; G01N 33/948; G01N 35/00029; G01N 35/1083; G01N 11/02; G01N 15/0656; G01N 15/088; G01N 15/1404; G01N 2001/007; G01N 2001/021; G01N 2001/1031; G01N 2001/105; G01N 2001/1418; G01N 2001/2217; G01N 2001/2261; G01N 2001/2282; G01N 2001/386; G01N 2015/0011; G01N 2021/0314; G01N 2021/0367; G01N 2021/054; G01N 2021/174; G01N 2021/3129; G01N 2021/458; G01N 2021/4711; G01N 2021/651; G01N 2021/825; G01N 2030/003; G01N 2035/00148; G01N 2035/00475; G01N 2035/1044; G01N 2035/1062; G01N 21/253; G01N 21/55; G01N 21/61; G01N 21/68; G01N 21/763; G01N 21/7703; G01N 21/783; G01N 21/8806; G01N 2201/06113; G01N 2201/12723; G01N 2223/04; G01N 2223/1013; G01N 2223/612; G01N 2291/018; G01N 2291/023; G01N 2291/0231; G01N 2291/0232; G01N 2291/0234; G01N 23/00; G01N 23/044; G01N 23/207; G01N 2333/032; G01N 2333/115; G01N 2333/12; G01N 2333/13; G01N 2333/145; G01N 2333/3156; G01N 2333/405; G01N 2333/43508; G01N 2333/45; G01N 2333/525; G01N 2333/70535; G01N 2333/765; G01N 2333/78; G01N 2333/914; G01N 2333/922; G01N 24/084; G01N 2405/08; G01N 2446/90; G01N 2458/10; G01N 2458/20; G01N 27/3278; G01N 27/403; G01N 27/44765; G01N 27/60; G01N 27/83; G01N 27/9006; G01N 2800/067; G01N 2800/24; G01N 2800/56; G01N 29/04; G01N 29/4427; G01N 29/4454; G01N 29/4481; G01N 31/164; G01N 33/0044; G01N 33/227; G01N 33/2888; G01N 33/32; G01N 33/445; G01N 33/5038; G01N 33/5047; G01N 33/534; G01N 33/563; G01N 33/5752; G01N 33/5755; G01N 33/57557; G01N 33/579; G01N 33/6866; G01N 33/6875; G01N 33/9413; G01N 33/942; G01N 33/9466; G01N 33/98; G01N 35/1072; G01N 1/12; G01N 1/20; G01N 15/0272; G01N 15/10; G01N 15/1429; G01N 15/1434; G01N 2001/1006; G01N 2001/2057; G01N 2001/242; G01N 2001/282; G01N 2001/4094; G01N 2015/0053; G01N 2015/0092; G01N 2015/0294; G01N 2015/084; G01N 2015/1454; G01N 2015/1497; G01N 2021/0106; G01N 2021/1714; G01N 2021/1736; G01N 2021/399; G01N 2021/4126; G01N 2021/6478; G01N 2021/775; G01N 2021/7753; G01N 2021/8466; G01N 2030/0025; G01N 2035/00455; G01N 2035/0094; G01N 2035/0097; G01N 2035/0406; G01N 2035/0458; G01N 2035/1039; G01N 21/29; G01N 21/293; G01N 21/6452; G01N 21/88; G01N 21/95; G01N 2201/0245; G01N

2201/0636; G01N 2201/0648; G01N 2201/0691; G01N 2201/0695; G01N 2201/127; G01N 2203/0019; G01N 2203/0044; G01N 2203/0274; G01N 2223/3306; G01N 2223/40; G01N 2223/616; G01N 2291/015; G01N 2291/02827; G01N 2291/02854; G01N 2291/0422; G01N 2291/0427; G01N 2291/045; G01N 2291/048; G01N 2291/105; G01N 23/06; G01N 23/083; G01N 23/20; G01N 2333/03; G01N 2333/19; G01N 2333/28; G01N 2333/385; G01N 2333/40; G01N 2333/4713; G01N 2333/58; G01N 2333/96463; G01N 2405/04; G01N 2410/00; G01N 2440/12; G01N 2440/20; G01N 2446/20; G01N 2446/86; G01N 25/08; G01N 25/32; G01N 27/123; G01N 27/28; G01N 27/327; G01N 27/3276; G01N 27/4175; G01N 27/44708; G01N 27/44786; G01N 27/72; G01N 27/9046; G01N 2800/06; G01N 2800/122; G01N 2800/2857; G01N 2800/321; G01N 2800/342; G01N 2800/38; G01N 29/045; G01N 29/0618; G01N 29/09; G01N 29/222; G01N 29/326; G01N 29/4463; G01N 29/4472; G01N 29/449; G01N 29/46; G01N 3/06; G01N 3/08; G01N 31/002; G01N 31/221; G01N 31/224; G01N 33/004; G01N 33/007; G01N 33/0073; G01N 33/0096; G01N 33/1806; G01N 33/2847; G01N 33/30; G01N 33/34; G01N 33/4905; G01N 33/502; G01N 33/5375; G01N 33/547; G01N 33/555; G01N 33/56977; G01N 33/57555; G01N 33/5757; G01N 33/576; G01N 33/6863; G01N 33/728; G01N 33/90; G01N 33/9433; G01N 33/9473; G01N 35/00613; G01N 5/02; G01N 5/045; G01N 7/16

See application file for complete search history.

(56) References Cited

U.S. PATENT DOCUMENTS 1,040 A 12/1838 John
3,545,491 A * 12/1970 Broerman .............. G01N 30/20 137/625.48
3,975,946 A * 8/1976 Ball ...................... G01N 30/20 137/625.15
4,869,282 A 9/1989 Sittler et al.
5,587,520 A 12/1996 Rhodes
6,067,864 A * 5/2000 Peterson ............. F16K 11/0743 73/863.33
6,227,034 B1 * 5/2001 Trochesset ............ G01N 30/20 422/89
6,453,725 B1 9/2002 Dahlgren et al.
6,601,606 B2 8/2003 Xu et al.
7,347,080 B2 3/2008 Mahoney et al.
7,485,176 B2 2/2009 Bentley et al.
9,249,890 B2 2/2016 Pratt et al.
9,335,307 B2 5/2016 Wang et al.
9,389,208 B2 7/2016 Bailey et al.
9,632,065 B2 * 4/2017 Gamache .............. F16K 11/022
10,060,865 B2 8/2018 Ruth et al.
10,060,866 B2 8/2018 Gellert et al.
10,401,330 B2 9/2019 Richter et al.
11,448,623 B2 * 9/2022 Simard-Lecours ..... F16K 11/22
11,506,643 B2 11/2022 Zhang et al.
12,253,497 B2 * 3/2025 May ...................... G01N 30/32
2008/0291966 A1 11/2008 Engel et al.
2009/0014078 A1 1/2009 Gamache et al.
2011/0233440 A1 9/2011 Gamache et al.
2013/0239656 A1 9/2013 Wang et al.
2015/0219578 A1 8/2015 Gellert
2016/0025688 A1 1/2016 Gamache
2016/0219578 A1 7/2016 Lim et al.
2018/0094522 A1 4/2018 Van Hal et al.
2019/0000489 A1 1/2019 McCoy et al.
2019/0242859 A1 8/2019 Schmidt
2019/0250131 A1 8/2019 Yoshida
2020/0088697 A1 3/2020 Nakama
2020/0326316 A1 10/2020 Simard-Lecours et al.
2023/0266280 A1 8/2023 May et al.

FOREIGN PATENT DOCUMENTS

CN 115427799 B 1/2026
EP 0400016 B1 4/1995
EP 0829716 A1 * 3/1998 .............. F16K 11/22
EP 3524975 A1 8/2019
JP 2019082434 A 5/2019
JP 2020041990 A 3/2020
JP 7040092 B2 3/2022
WO 2007028130 A2 3/2007
WO 2019144228 A1 8/2019
WO 2021119816 A1 6/2021

OTHER PUBLICATIONS

Siemens, A5E42019844001 Maxum II Valves and Oven Components, Service Manual, Oct. 2018, 110 pages.
Application and Drawings for U.S. Appl. No. 18/751,687, filed Jun. 24, 2024, 19 pages.
Siemens Maxum Edition II Detectors—Service Manual, https://cache.industry.siemens.com/dl/files/764/109757764/att_951875/v1/A5E42019847001-Maxum-Edition-II-Detectors.pdf, Dated May 2018, 58 pages.
Application and Drawings for U.S. Appl. No. 18/619,768, filed Mar. 28, 2024, 18 pages.
International Search Report and Written Opinion for International Application No. PCT/US2025/033452, mailed Oct. 22, 2025, 12 Pages.
International Search Report and Written Opinion for PCT Application No. PCT/US2025/021451, dated Jun. 25, 2025, 9 pages.
Non-Final Office Action for U.S. Appl. No. 18/619,768, mailed Feb. 23, 2026, 10 Pages.
Siemens: "Maxum II Valves and Oven Components Service Manual," A5E42019844001, Oct. 2018, 110 Pages.
Notice of Allowance for U.S. Appl. No. 18/751,687, dated May 8, 2026, 11 Pages.

* cited by examiner

MULTIPORT GAS CHROMATOGRAPH PISTON VALVE

BACKGROUND

Gas chromatography is the separation of a mixture of chemical compounds due to their migration rates through a chromatographic column. This separates the compounds based on differences in boiling point, polarity, or molecular size. The separated compounds then flow across a suitable detector, such as a thermal conductivity detector (TCD) that determines the concentration of each compound represented in the overall sample. Knowing the concentration of the individual compounds makes it possible to calculate certain physical properties such as BTU or specific gravity using industry-standard equations.

A gas chromatograph is an analyzer that passes a small volume of gas through chromatographic columns to separate and individually measure the unique gas components of the sample mixture. The analysis cycle can be split into two general phases. The first phase is a sample injection phase, and the second phase is the separation and measurement phase.

Multiport valves are used in gas chromatographs for a number of reasons. One of the reasons is precise sample injection. Multiport valves enable reproducible and accurate injection of small sample volumes (typically microliters) into the carrier gas stream. This is achieved through a loop injector design, where the sample is trapped in a loop before being injected onto the column. The multiport valve controls the flow of gas to fill and empty the loop, ensuring consistent injection every time. Another reason multiport valves are used is for flow path switching. Multiport valves can direct the flow of gases within the gas chromatography system. This allows for different configurations depending on the analysis needs. For example, such valves can direct the sample to the column, bypass the column for purging, or switch between different columns for multidimensional separation. This versatility improves the flexibility and functionality of the GC system. Still another reason multiport valves are used is for automation. Multiport valves are easily actuated with pneumatic or electronic controls, facilitating automated operation of the GC system. This significantly improves efficiency and reduces human error compared to manual valve manipulation.

SUMMARY

A multiport gas chromatograph piston valve includes a first plate, a first diaphragm, a second plate, a second diaphragm, a plurality of pistons, and a third plate. The first plate has a bottom surface and includes a plurality of analytical gas ports. The first diaphragm is disposed adjacent the bottom surface of the first plate. The first diaphragm includes a gas flow path in fluidic communication with the plurality of analytical gas ports. The second plate has a plurality of apertures therethrough. The plurality of pistons, each piston having a base and a cylindrical portion that is configured to be slidably received by a respective aperture in the second plate, are disposed such that the bases of the pistons are in substantially one plane when the valve is not actuated. A second diaphragm includes a first plurality of gas pockets and a second plurality of gas pockets, wherein the first plurality of gas pockets are disposed adjacent a first set of pistons, and the second plurality of gas pockets are disposed adjacent a second set of pistons. The third plate includes a first gas activation port and a second gas activation port, the first gas activation port being fluidically coupled to the first plurality of gas pockets, and wherein the second gas activation port is coupled to the second plurality of gas pockets.

DETAILED DESCRIPTION OF ILLUSTRATIVE EMBODIMENTS

Figure 1A:
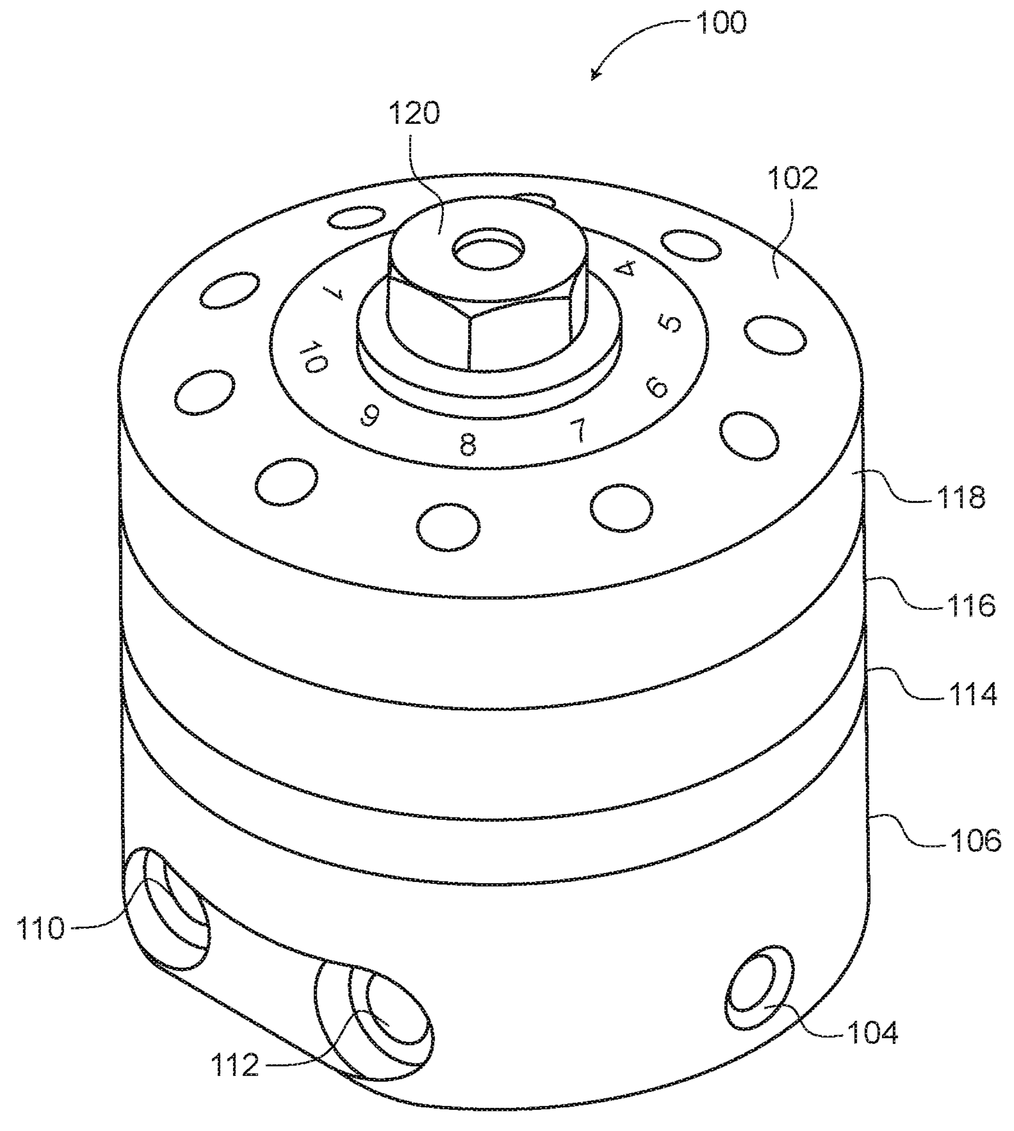
FIG. 1A is a perspective view of a multiport piston diaphragm analytical valve in accordance with the prior art.

FIG. 1A is a perspective view of a multiport piston diaphragm analytical valve widely used in the chromatography industry. Valve 100 is shown having 10 different ports labeled 1-10 on a top surface 102 thereof. Valve 100 includes an actuation port 104 in plate 106 as well as a similar actuation port 108 (shown in FIG. 1B) on an opposite side of plate 106. Plate 106 also includes a pair of mounting holes 110, 112 for installation. As can be seen in FIG. 1A, valve 100 is comprised of four plates: 106, 114, 116, and 118. The plates are compressed together by fastener 120.

Figure 1B:
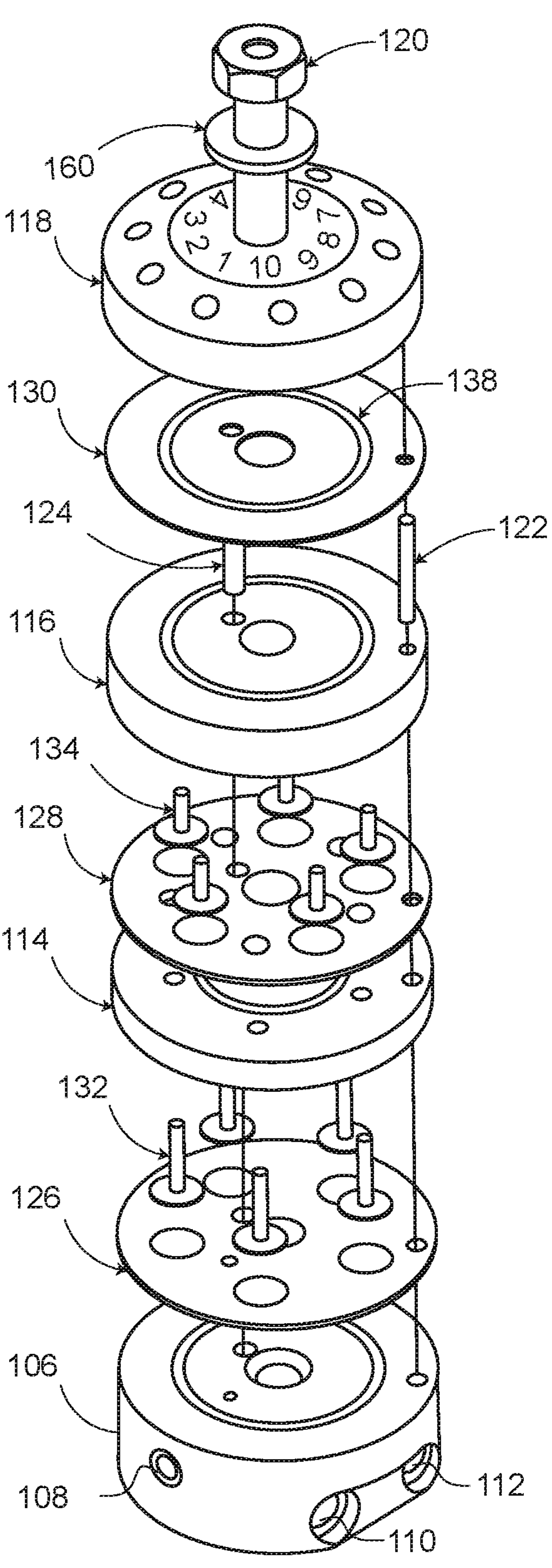
FIG. 1B is an exploded view of a multiport piston diaphragm analytical valve in accordance with the prior art.

FIG. 1B is an exploded view of the multiport piston diaphragm analytical valve shown in FIG. 1A. As shown in FIG. 1B, valve 100 includes a pair of alignment pins 122, 124 that extend into plates 106 and 118 and through plates 114 and 116. Additionally, alignment pins extend through diaphragms 126, 128, and 130. A set of lower pistons 132 is positioned adjacent diaphragm 126 while a set of upper pistons 134 is positioned adjacent diaphragm 128. Constrained by space, lower pistons 132 are housed in plate 114, while upper pistons 134 are housed in plate 116. By moving lower pistons 132 or upper pistons 134 upwards to compress gas path 138 against the bottom surface of plate 118, lower pistons 132 and/or upper pistons 134 can seal gas flow through the gas path 138 of upper diaphragm 130 to stop analytical gases (sample and carrier) from one port to another. By alternatively moving lower pistons 132 and upper pistons 134, gas flow among the various ports 1-10 on plate 118 can be switched.

Figure 1C:
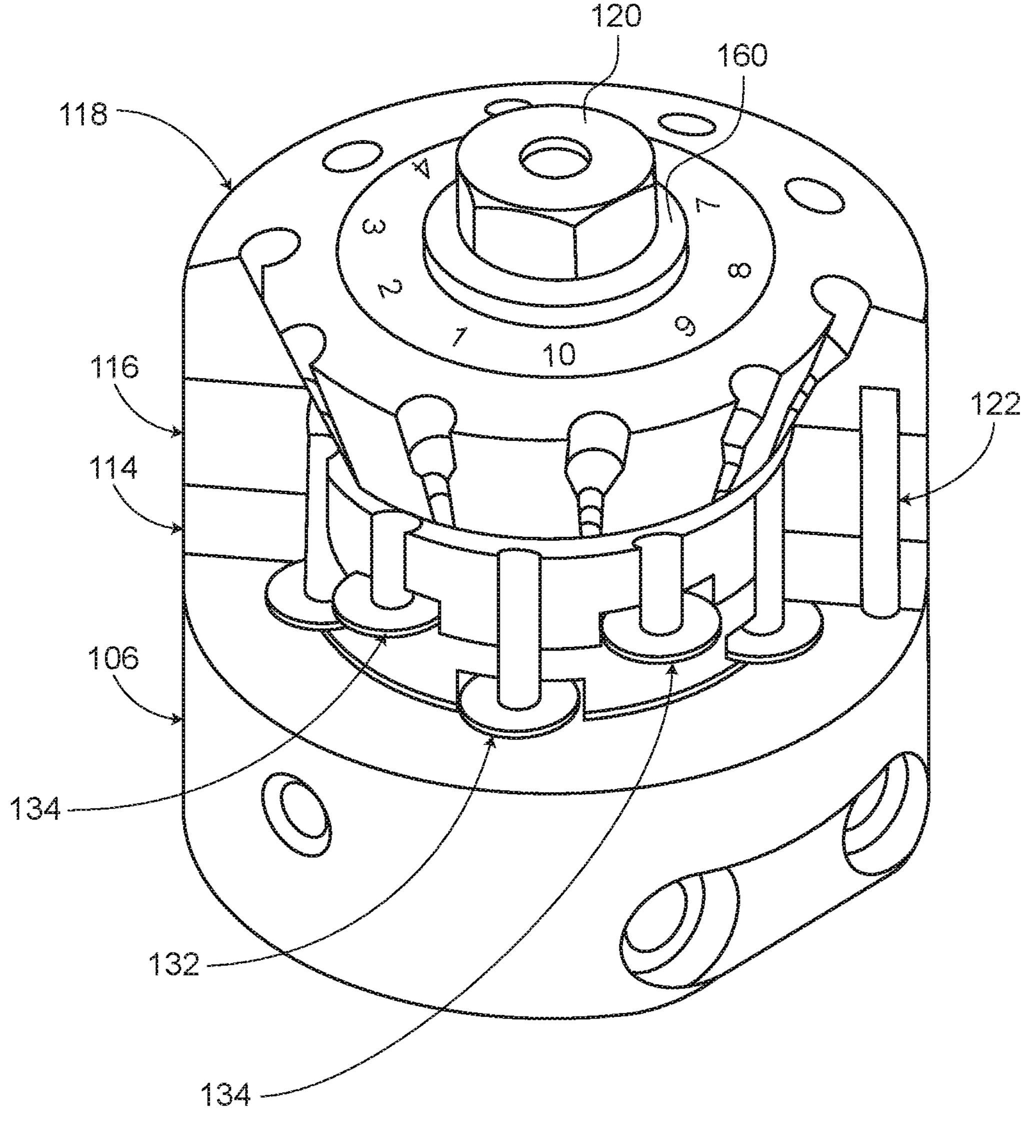
FIG. 1C is a perspective partial cutaway view of a multiport piston diaphragm analytical valve in accordance with the prior art.
Figure 1D:
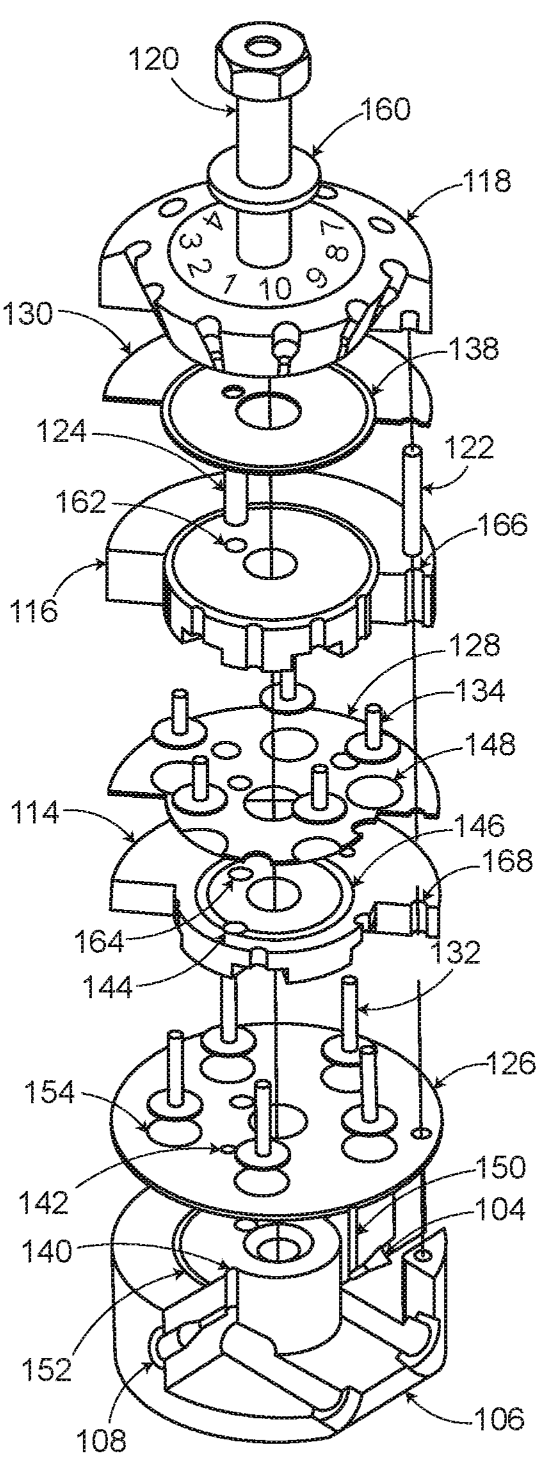
FIG. 1D is an exploded partial cutaway view of a multiport piston diaphragm analytical valve in accordance with the prior art.

Referring to FIGS. 1D and 1C, by pressurizing port 108, activation gas goes through holes 140, 142, and 144 to pressurize gas slot 146 on plate 114, which pressurizes gas pockets 148 on diaphragm 128 and pushes upper pistons 134 upwards against gas flow path 138 on diaphragm 130 to seal analytical gas flows. In this case, analytical gases (sample and/or carrier) pressurize gas flow path 138, which pushes lower pistons 132 down and allows flow through ports 10 to 1, 2 to 3, 4 to 5, 6 to 7, and 8 to 9.

Referring to FIGS. 1D and 1C, by pressurizing port 104, activation gas goes through holes 150, to pressurize slot 152 on plate 106, which pressurizes gas pockets 154 on diaphragm 126 and pushes lower pistons 132 upwards against flow path 138 on diaphragm 130 to seal analytical gas flows. In this case, analytical gases (sample and/or carrier) pressurize gas flow path 138, which pushes upper pistons 134 downward, and allows flow through ports 1 to 2, 3 to 4, 5 to 6, 7 to 8, and 9 to 10.

Referring to FIGS. 1B and 1C, one limitation of multiport valves that employ relatively long pistons, such as lower pistons 132, is that the pistons must pass through both plates 114 and 116. During valve assembly, torque is applied to fastener 120. Partial tightening torque is transferred from fastener 120 through washer 160, plate 118, diaphragm 130, plate 116, diaphragm 128, plate 114, and diaphragm 126 to plate 106 by friction. The relative positions of plate 118, diaphragm 130, plate 116, diaphragm 128, plate 114, diaphragm 126, and plate 108 are constrained by pins 122, 124.

Referring to FIG. 1D, the fits between pin 122 and holes on plate 106, plate 114, plate 116, and plate 118 are clearance fits for manufacturability and serviceability. Clearance fits also apply to pin 124. The relative position between plates 116 and 114 shifts due to the clearance between pins 124 and holes 162 and 164 as well as the clearance between pin 122 and holes 166 and 168. The relative position between plates 114 and 116 can also shift due to the deformation of pin holes 162, 166 caused by high tightening toque during assembly. The shift between plate 116 and plate 114 can cause binding of lower pistons 132 because pistons 132 pass through both plate 114 and plate 116. The binding or restriction of free movement of lower pistons 132 can cause gas to leak and/or blockage between ports, which can adversely affect operation of the multiport valve.

Figure 2A:
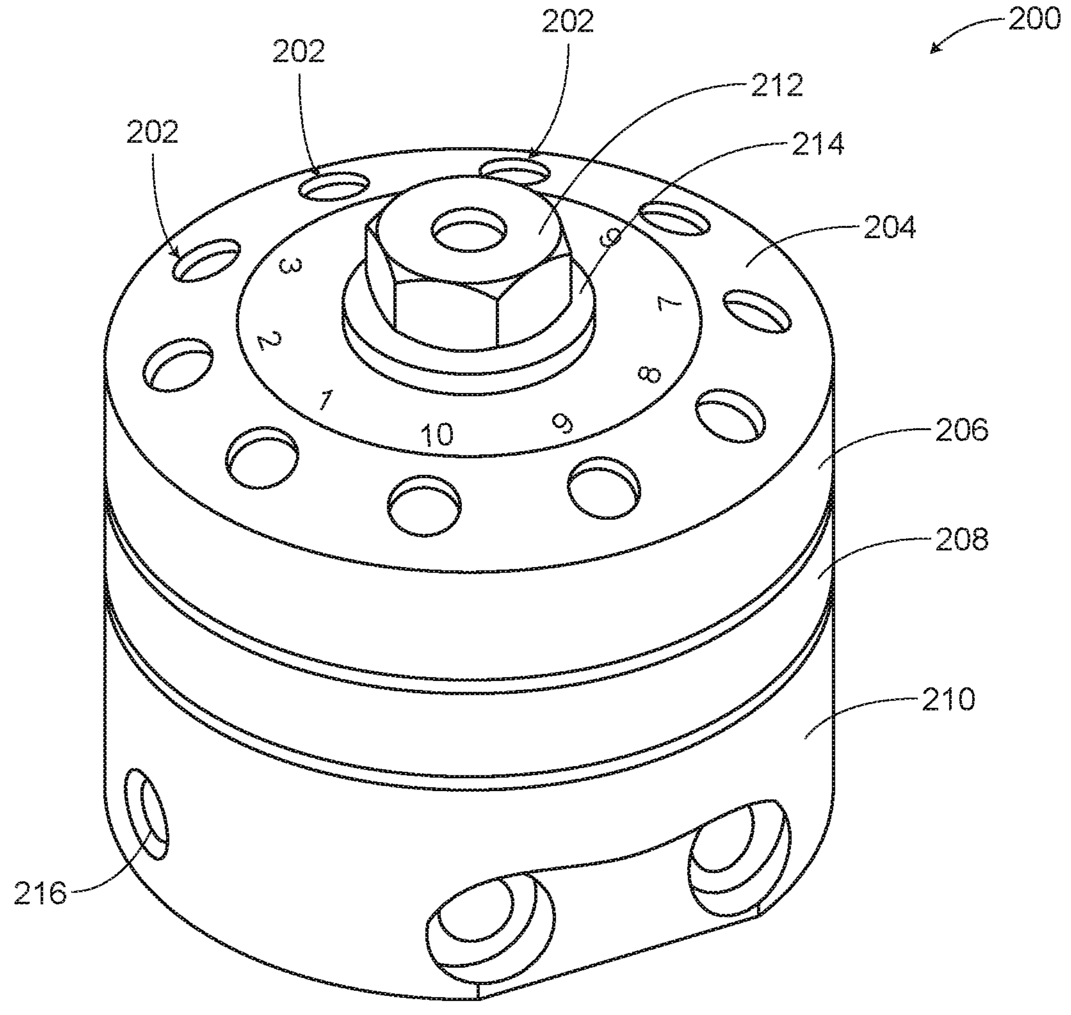
FIG. 2A is a perspective view of a multiport gas chromatograph piston valve in accordance with an embodiment of the present invention.

FIG. 2A is a perspective view of a multiport gas chromatograph piston valve in accordance with an embodiment of the present invention. Valve 200, in the illustrated example, includes ten ports 202 on a top surface 204 thereof. Valve 200 is constructed of three distinct plates or members 206, 208, and 210 that are clamped together by fastener 212 and washer 214. Valve 200 includes a pair of activation ports 216, 218 (shown in FIG. 2B) that are configured to receive activation gas to activate and deactivate valve 200 for analytical ports flow directions switching.

Figure 2B:
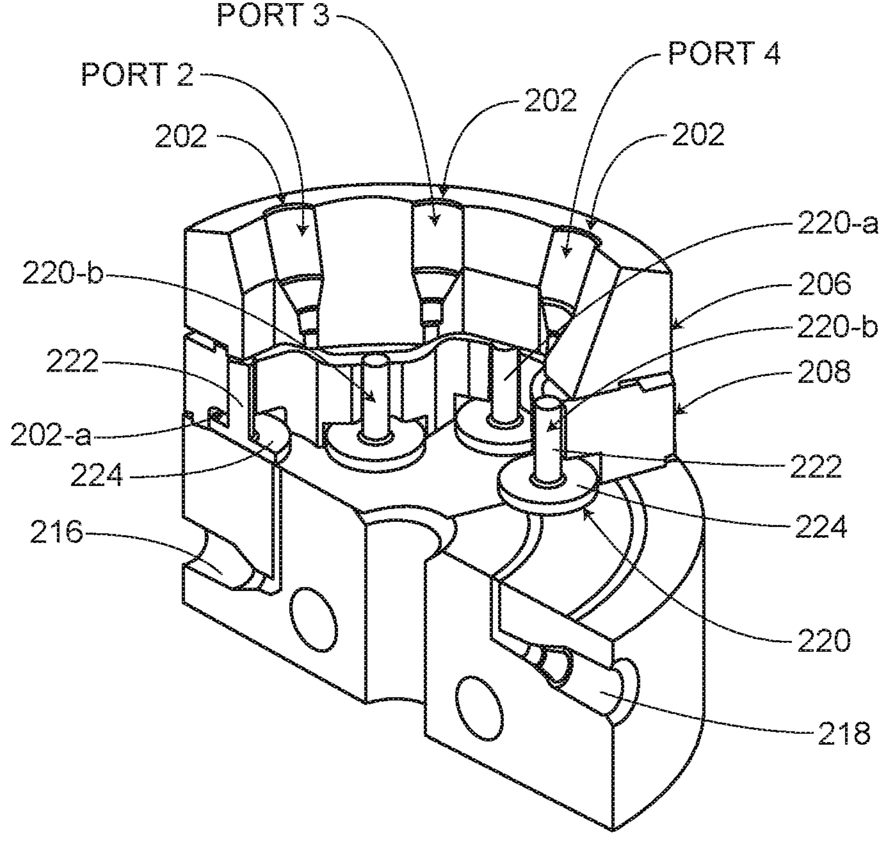
FIG. 2B is a perspective cutaway view of a multiport gas chromatograph piston valve in accordance with an embodiment of the present invention.

FIG. 2B is a perspective cutaway view of a multiport gas chromatograph piston valve in accordance with an embodiment of the present invention. FIG. 2B shows a number of pistons 220 that are positioned below and between adjacent ports 202. Each piston 220 includes a circular shaft 222 and a base 224. As can be seen, when the valve is in a non-activated state (i.e., both ports 216, 218 are depressurized) the bases 224 of all pistons 220 lie in substantially the same plane.

Figure 2C:
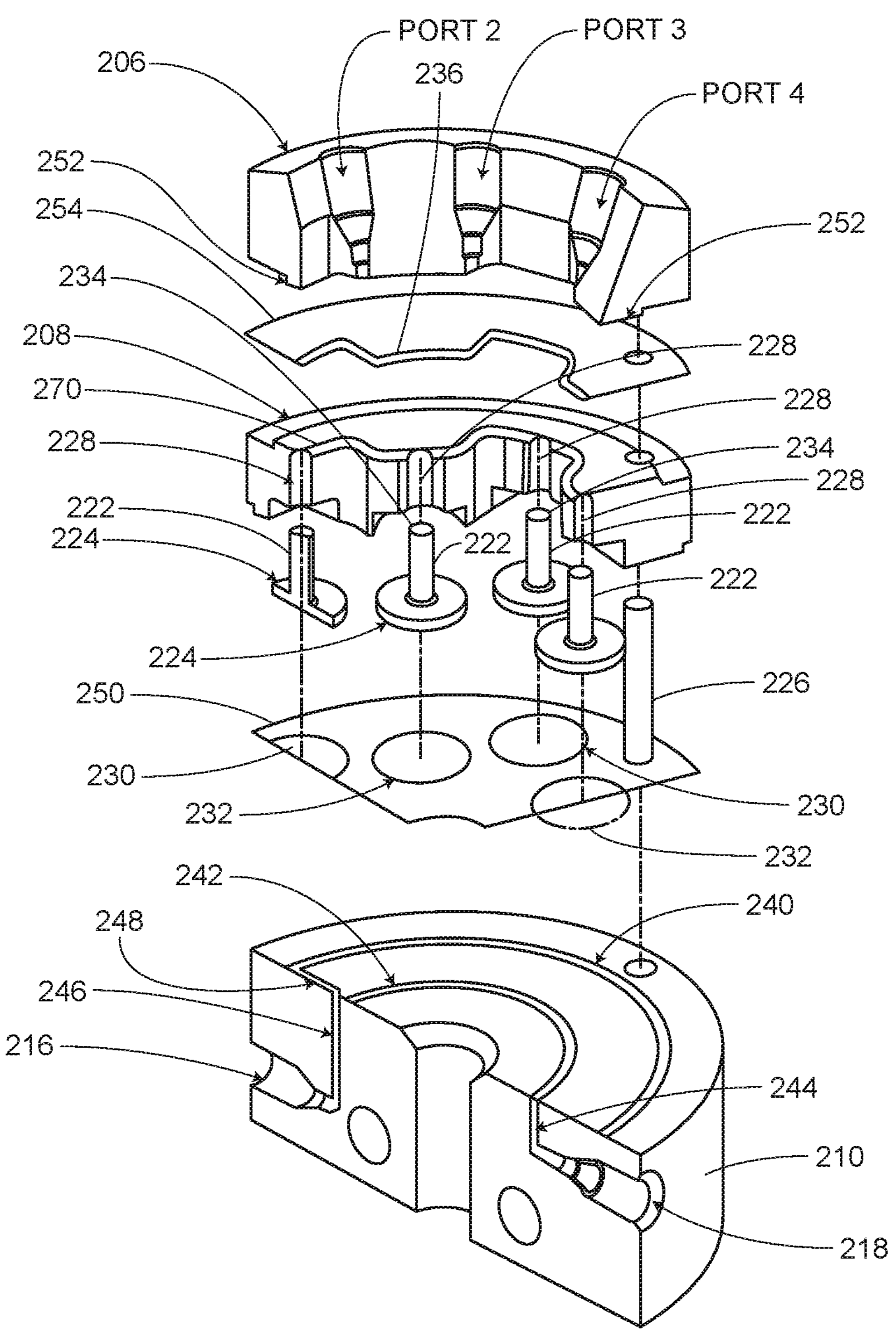
FIG. 2C is a cross-sectional exploded view of a multiport gas chromatograph piston valve in accordance with an embodiment of the present invention.

FIG. 2C is a cross-sectional exploded view of a multiport gas chromatograph piston valve in accordance with an embodiment of the present invention. FIG. 2C shows circular shafts 222 of pistons 220 being slidably received within apertures 228 of plate 208. Additionally, each base portion 224 of pistons 220 is positioned directly above one of a first plurality of gas pockets 230 or a second plurality of gas pockets 232. As shown, each piston 220 includes an end 234 on cylindrical portion 222 that is configured to bear against and obstruct a flow path 236. Each of gas pockets 230 is over outer flow passageway 240 and does not fluidically communicate with inner flow passageway 242. Similarly, each of gas pockets 232 is over inner flow passageway 242 and does not fluidically communicate with outer flow passageway 240. Inner flow passageway 242 is fluidically coupled to activation port 218 via hole 244. Outer flow passageway 240 is fluidically coupled to activation port 216 via hole 246 and channel 248.

Embodiments described herein generally arrange all pistons 220 on the same plate (i.e., plate 208) so all pistons 220 are free of moving axially. Referring to FIG. 2B, some pistons, 220-*a*, are located closer to an edge of lower diaphragm 250 than other pistons, 220-*b*. Referring to FIGS. 2C and 2B, when activation port 216 is pressurized, activation gas flows through hole 246 and channel 248 to outer flow passageway 240. When this occurs, outer gas pockets 230 on lower diaphragm 250 become pressurized and lift base portions 224 of pistons 220-*a* that are disposed above pressurized outer gas pockets 230. As the set of pistons 220-*a* lifts, ends 234 will press into gas pathway 236 on upper diaphragm 254 and compress gas pathway 236 into the bottom surface 252 of plate 206. This stops analytical gas flow through gas pathway 236 on upper diaphragm 254 and obstructs flow. In this case, analytical gases (sample and carrier) pressurize gas flow path 236 on upper diaphragm 254 and push inner pistons 220-*b* downward. This allows flow through ports 2 to 3, 4 to 5, 6 to 7, 8 to 9, and 10 to 1. The gas flow path 236 in upper diaphragm 254 can be either be pre-formed or naturally formed when analytical ports are pressurized during application runs.

When activation port 218 is pressurized and port 216 is depressurized, activation gas flows through hole 244 and inner flow passageway 242. This pressurizes gas pockets 232 and lifts pistons 220-*b* that are disposed above gas pockets 232. The lifted pistons 220-*b* are pressed against bottom surface 252 of plate 206 to stop analytical gases from flowing through gas pathway 236 on upper diaphragm 254. In this case, analytical gases (sample and carrier) pressurize gas flow path 236 which pushes outer pistons 220-*a* downwards and allows flow through ports 1 to 2, 3 to 4, 5 to 6, 7 to 8, and 9 to 10. By alternately pressurizing activation port 216 and depressurizing port 218 or pressurizing activation port 218 and depressurizing port 216, analytical gases can be switched to flow through one port or another. Gas pockets 230 and 232 in lower diaphragm 250 are naturally formed when applying activation gas to the activation ports.

Each of diaphragms 250, 254 can be constructed from a single layer or can be constructed from multiple layers in order to increase durability and reliability. In embodiments where one or both diaphragms 250, 254 are constructed from multiple layers, it is expressly contemplated that each layer may be formed of the same material or may be formed of different materials.

Figure 2D:
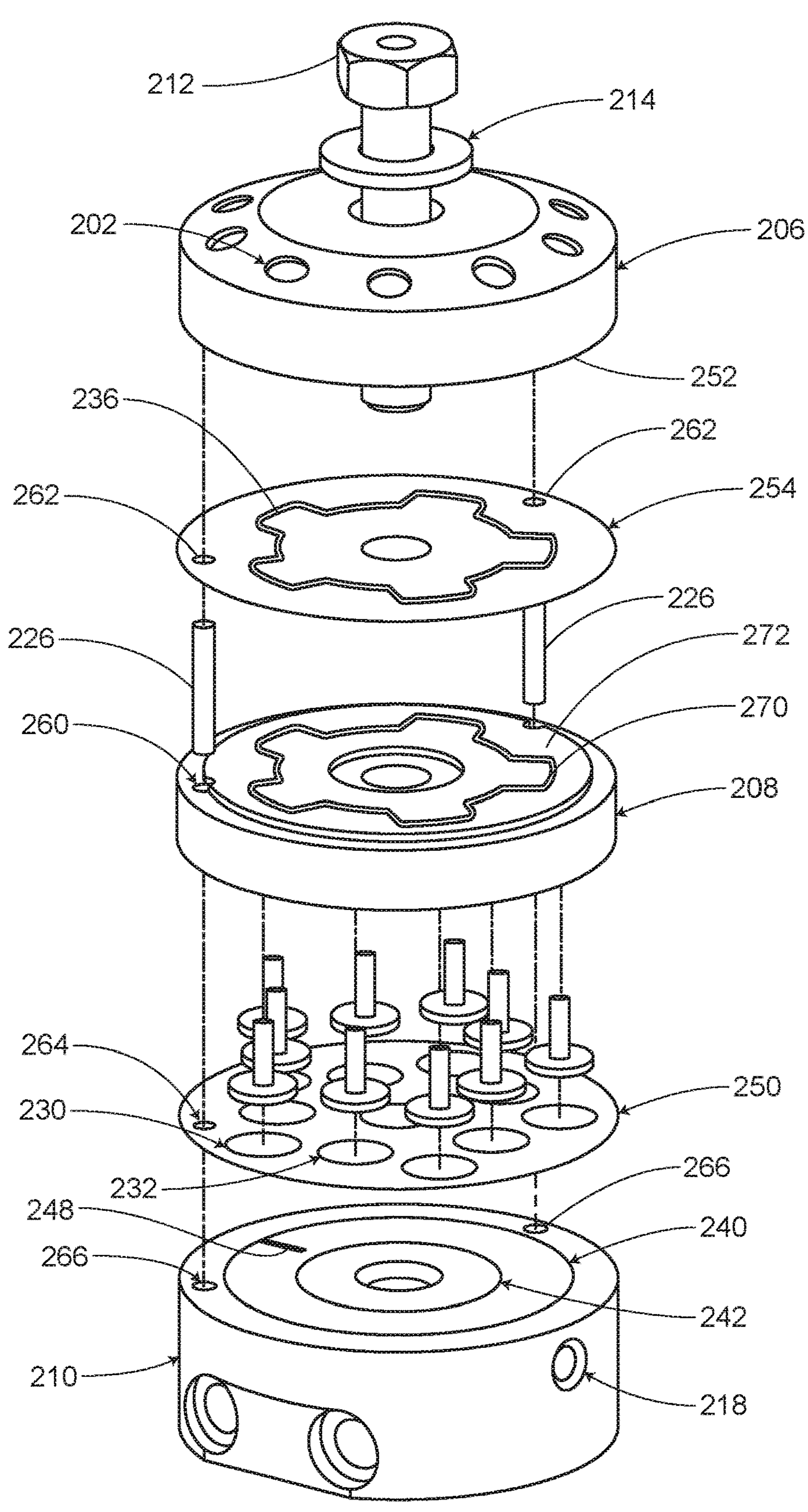
FIG. 2D is an exploded view of a multiport gas chromatograph piston valve in accordance with an embodiment of the present invention.

FIG. 2D is an exploded view of a multiport gas chromatograph piston valve in accordance with an embodiment of the present invention. FIG. 2D shows alignment pins 226 configured to pass through holes 260 in plate 208 as well as holes 262 in diaphragm 254 and holes 264 in diaphragm 250. Alignment pins 226 extend partially into holes within plate 206 as well as holes 266 of plate 210. Alignment pins 226 allow the entire valve 200 to be clamped together using a single fastener 212 and washer 214.

FIGS. 2C and 2D show a passageway 270 formed within upper surface 272 of plate 208. This passageway, as shown in FIG. 2C, only extends partially into upper surface 272 of plate 208. Additionally, the path of gas pathway 236 in upper diaphragm 254 follows passageway 270 in plate 208.

As shown above, some embodiments generally provide two sets of pistons 220-*a* and 220-*b* with each set located above a respective flow passageway 240, 242. Given the different radii of flow passageways 240, 242, this allows pistons 220 to be positioned in a compact manner thereby reducing the overall size of valve 200 and reducing material cost. More importantly, all pistons 220 can slide up and down freely because they are all housed on the same plate 208, not like pistons 132 (shown in FIG. 1C) which cross both plates 114 and 116. However, it is expressly contemplated that embodiments can be practiced where all pistons 200 are positioned at the same radius as long as the two different flow passageways 240, 242 have a path or geometry that only fluidically communicates with a particular set of pistons 220.

Although the present invention has been described with reference to preferred embodiments, workers skilled in the art will recognize that changes may be made in form and detail without departing from the spirit and scope of the invention.

What is claimed is:

1. A multiport gas chromatograph piston valve comprising:

a first plate having a plurality of analytical gas ports, the first plate having a bottom surface;

a first diaphragm disposed adjacent the bottom surface of the first plate, the first diaphragm having a gas flow path in fluidic communication with the plurality of analytical gas ports;

a second plate having a plurality of apertures therethrough;

a plurality of pistons, each piston having a base and a cylindrical portion that is configured to be slidably received by a respective aperture in the second plate, wherein the bases of the pistons are disposed in substantially-one plane when the valve is not actuated;

a second diaphragm having a first plurality of gas pockets and a second plurality of gas pockets, wherein the first plurality of gas pockets are disposed adjacent a first set of pistons, and the second plurality of gas pockets are disposed adjacent a second set of pistons; and a third plate having a first gas activation port and a second gas activation port, the first gas activation port being fluidically coupled to the first plurality of gas pockets, and wherein the second gas activation port is coupled to the second plurality of gas pockets.

2. The multiport gas chromatograph piston valve of claim 1, wherein the third plate has a top surface adjacent the second diaphragm, and wherein the top surface includes an inner flow passageway in fluidic communication with the first plurality of gas pockets.

3. The multiport gas chromatograph piston valve of claim 2, wherein the third plate includes a first hole fluidically coupling the first activation port to the inner flow passageway.

4. The multiport gas chromatograph piston valve of claim 2, wherein the top surface of the third plate includes an outer flow passageway in fluidic communication with the second plurality of gas pockets.

5. The multiport gas chromatograph piston valve of claim 4, wherein the third plate includes a second hole fluidically coupling the second activation port to the outer flow passageway.

6. The multiport gas chromatograph piston valve of claim 1, wherein the number of pistons comprising the plurality of pistons is the same as the number of ports comprising the plurality of analytical ports.

7. The multiport gas chromatograph piston valve of claim 6, wherein the number of ports is an even number greater than 3.

8. The multiport gas chromatograph piston valve of claim 7, wherein the number of ports is 4.

9. The multiport gas chromatograph piston valve of claim 7, wherein the number of ports is 6.

10. The multiport gas chromatograph piston valve of claim 7, wherein the number of ports is 8.

11. The multiport gas chromatograph piston valve of claim 7, wherein the number of ports is 10.

12. The multiport gas chromatograph piston valve of claim 1, wherein each piston includes an end that is configured to press the gas flow path in the first diaphragm against the bottom surface of the first plate to obstruct flow.

13. The multiport gas chromatograph piston valve of claim 1, wherein when the first activation port is pressurized and while the second activation de-pressurized, each analytical gas port is coupled to an adjacent analytical gas port on a first side of the analytical gas port, and when the second activation port is pressurized and the first activation port is de-pressurized, each analytical gas port is coupled to an adjacent analytical gas port on a second side of the analytical gas port.

14. The multiport gas chromatograph piston valve of claim 13, wherein the second side is opposite the first side.

15. The multiport gas chromatograph piston valve of claim 1, and further comprising at least one alignment pin extending through the first diaphragm, second plate, and second diaphragm.

16. The multiport gas chromatograph piston valve of claim 15, wherein the at least one alignment pin includes a plurality of alignment pins.

17. The multiport gas chromatograph piston valve of claim 16, and further comprising a single fastener clamping the valve together.

18. The multiport gas chromatograph piston valve of claim 1, wherein the first set of pistons are disposed at a first radial distance, and the second set of pistons are disposed at a second radial distance, and wherein the second radial distance is greater than the first radial distance.

19. The multiport gas chromatograph piston valve of claim 1, wherein the second plate has an upper surface that includes a passageway that follows the gas flow path in the first diaphragm.

20. The multiport gas chromatograph piston valve of claim 1, wherein each gas pocket of the first and second gas pockets is centered below a respective aperture in the second plate.

* * * * *